United States Patent [19]

Miller

[11] 3,890,106
[45] June 17, 1975

[54] SELECTIVE COLD WORK HARDENING OF METALLIC EXTRUSIONS

[75] Inventor: Paul J. Miller, Richmond Heights, Ohio

[73] Assignee: The Weatherhead Company, Cleveland, Ohio

[22] Filed: Feb. 27, 1973

[21] Appl. No.: 336,274

[52] U.S. Cl. .................................................. 29/183
[51] Int. Cl. ............................................... B22f 5/00
[58] Field of Search..... 148/39; 113/116 P, 120 UE; 29/DIG. 25, DIG. 49, 156.7 R, 183; 72/76, 53; 303/84 A; 200/82 D

[56] References Cited
UNITED STATES PATENTS

| | | | |
|---|---|---|---|
| 1,348,967 | 8/1920 | Somers | 29/DIG. 49 |
| 1,416,846 | 5/1922 | Leighton | 148/39 X |
| 1,597,189 | 8/1926 | Gebo | 29/DIG. 49 |
| 2,077,639 | 4/1937 | Minich | 148/12 X |
| 2,112,231 | 3/1938 | Speidel | 29/DIG. 49 |
| 3,369,090 | 2/1968 | Turchan | 303/84 A X |
| 3,517,533 | 6/1970 | Koznar | 72/76 |
| 3,542,438 | 4/1969 | Falk | 303/84 A X |
| 3,665,881 | 5/1972 | Koch et al. | 113/119 |
| 3,732,126 | 5/1973 | Cobb et al. | 148/12 X |

OTHER PUBLICATIONS

American Brass Company – Anaconda Copper and Copper Alloys Anaconda Publ. B-28, 8th Ed. 1945 pp. 6, 16, 17, 31, 32.

*Primary Examiner*—L. Dewayne Rutledge
*Assistant Examiner*—O. F. Crutchfield
*Attorney, Agent, or Firm*—McNenny, Farrington, Pearne & Gordon

[57] ABSTRACT

A metal body member having an integral fitting or coupling portion with selectively hardened port areas including seat and threaded portions. The body member is formed by cutting a transverse blank from extruded material and by subsequently cold working the port area of the blank through plastic displacement of material in the area with an appropriately sized tool. Localized hardening of the port area eliminates the possibility of coupling failure due to over-torquing of the associated fitting components and leaves nonport areas relatively soft for subsequent independent forming operations to complete the body member.

5 Claims, 4 Drawing Figures

SELECTIVE COLD WORK HARDENING OF METALLIC EXTRUSIONS

BACKGROUND OF THE INVENTION

The invention relates to improvements in body members having coupling portions and methods for their manufacture and, more specifically, the invention pertains to a method by which a portion of the valve body is locally hardened at critical areas for improved service.

PRIOR ART

A body such as for a hydraulic valve normally includes a port area having integral threads and/or a seat which is engageable with a complementarily formed part to make a fluid tight connection. A recurrent problem with such integral fitting portions has been failure of threaded or seat areas of the fitting due to excessive stress developed by over-torquing of the fitting when threaded with the connecting part. When the applied torque is substantially in excess of that required to effect a seal, a fitting body portion, or tube connected thereto, may be permanently damaged such that it will no longer provide a satisfactory seal or the seat area may be caused to collapse resulting in restriction of the flow passage.

A preferred manner of mass producing valve bodies includes an initial step of extruding metal through a die into finished cross section. Extruded material, normally brass in the automotive field, is cut into individual sections or blanks and subsequently machined or otherwise formed into finished valve bodies incorporating integral fitting portions. Generally, the hardness and strength of such valve body members is substantially that which results from the extrusion and drawing process. The resulting hardness of brass may be relatively low where it is hot extruded and drawn. There is no significant cold working of the material in the extrusion process. Irregular cross sectional shapes are particularly difficult to work harden during extrusion and drawing processes. Moreover in materials such as brass it is not possible to harden by heat treatment after forming operations.

SUMMARY OF THE INVENTION

The invention provides a body member and a method for its manufacture wherein a port area of the body is locally hardened to eliminate possible failure resulting from inadvertent over-torquing of the fitting portion. The port area of individual body blanks is selectively cold worked to increase its hardness relative to adjacent body portions. The degree of cold working is preferably sufficient to increase the hardness of the port area throughout its full cross section.

In a preferred embodiment disclosed hereinbelow, the invention is applied to a multi-ported body adapted for use as an automotive brake warning switch housing. Each of the hardened body ports is of the inverted flare type wherein both the seat and threads are internal of the body. According to the disclosed method, blanks for forming the bodies are made by cutting flat transverse sections from elongated bars of extruded brass stock. The blanks are then locally work hardened at areas in which the ports are ultimately formed. This is accomplished, according to the invention, by plastically displacing material under compression at the outer surfaces of the port areas with tools roughly approximating the port areas in size.

The tool faces are caused to penetrate the blanks a distance sufficient to cause displaced material to be work hardened from one side of the blank through to the other side. Subsequent to this punching operation, the ports are machined with conventional tools to form threads and seat areas therein. Work hardening of the seat and threaded areas substantially eliminates the possibility of failure of the fitting through inadvertent application of excess torque. It is contemplated that a single punch rather than opposed punches may be used for certain applications or the tool may be in the form of a rotary male punch somewhat like a "sheep foot" roller.

The disclosed method of hardening critical areas of a body member by work hardening only limited areas provides significant advantages when used in mass production applications. Since the work hardened area is limited in size, the energy expended in deforming it is minimized. Punching operations are therefore readily adaptable to high speed production techniques. Selective hardening of the body member, as an additional advantage, leaves other non-hardened areas relatively ductile. This permits such other areas to be separately worked and shaped for various purposes.

DESCRIPTION OF THE PREFERRED EMBODIMENT

Figure 2:
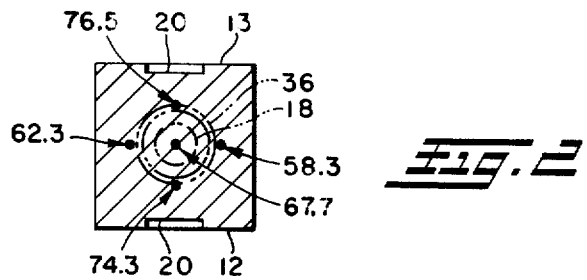
FIG. 2 is a sectional view of a first port area of the body blank taken along the line 2—2 indicated in FIG. 1.
Figure 1:
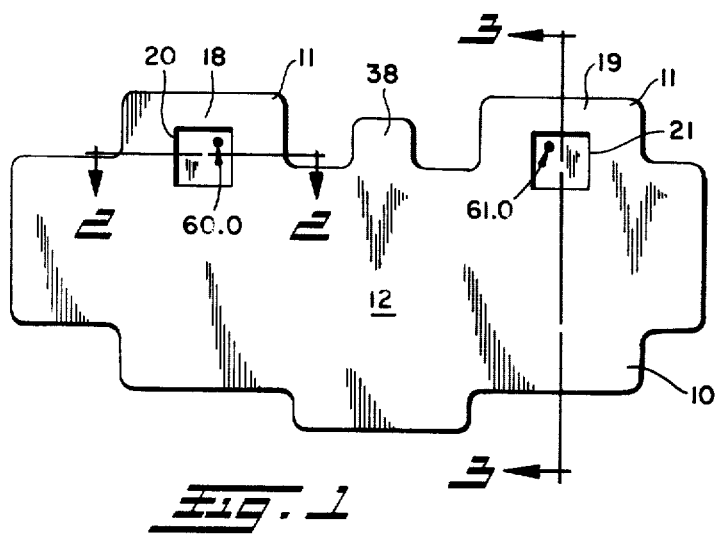
FIG. 1 is a side view of a body blank formed in accordance with the invention.
Figure 3:
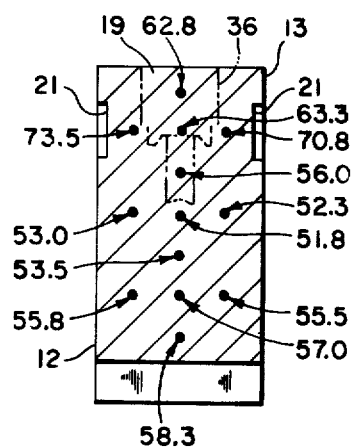
FIG. 3 is a sectional view of a second port area of the body blank taken along the line 3—3 indicated in FIG. 1.

Referring now to the drawing, there is shown in FIGS. 1 through 3 a blank 10 for a valve or switch housing body. The body blank 10, chosen to illustrate the principles of the invention, is adapted to ultimately be used as an automotive brake warning switch housing, in which hydraulically actuated parts are contained, of the general type illustrated in U.S. Pat. No. 3,369,090. The body blank 10 is a generally flat or planar block having an irregular cross section providing at least two main projections 11. The projections 11, as discussed in detail below, are arranged to provide separate port areas or zones each adapted to be connected with fittings (not shown).

Preferably, the blank 10 is formed from a brass billet extruded through a die having a shape defining the cross section or outline of the blank. An extruded bar may thereafter be further processed by a sizing or drawing operation into a bar having a cross-sectional shape corresponding to the cross-sectional shape of the blank. The shaped bar is then cut into individual blanks by sawing or otherwise severing the material across successive planes transverse to the direction of extrusion. This transverse cutting results in oppositely facing planar sides 12 and 13 of the blank 10.

The base material forming the blank 10 is a work hardenable metal and, preferably, is brass such as the type designated SAE CA-360 or SAE 72. Preferably, a billet of this material is heated until it is in a soft and highly plastic state and is then extruded through an opening of the appropriately shaped die. Of course, other work hardenable materials may be used in the practice of the invention.

It is particularly difficult to work harden a material to any substantial extent during a die forming process when it is changed, as in the present case, into a relatively irregular shape. After each blank 10 is formed, the material constituting critical port areas may be locally work hardened by plastic deformation, according to the invention, to increase the strength and hardness of such areas to a higher degree than that resulting from the extrusion process.

Central zones 18 and 19 define port areas of the associated projections 11. These port areas 18 and 19 are locally strain or cold work hardened, in accordance with the invention, by punches or tools (not shown) directed against the planar sides 12 and 13 of the blank in a direction parallel to the extrusion direction. Faces of the tools may be provided with a suitable configuration and in the illustrated case are provided with square planar surfaces such that upon engagement with the blank 10 they form square indentations or recesses 20 and 21 in the sides 12 and 13 of the blank. As illustrated in FIGS. 2 and 3, the blank 10 is preferably struck simultaneously from opposite sides to insure that all of the material between the planar sides 12 and 13 in the port areas 18 and 19 is locally work hardened. Alternatively, the sides 12 and 13 may be struck in sequence or only one side may be struck.

Figure 4:
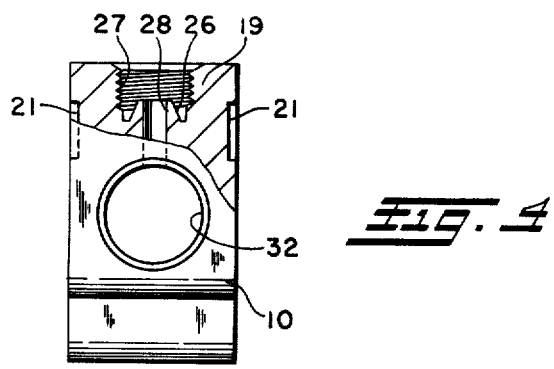
FIG. 4 is an end view of a finished body member, partially in section, taken along a direction parallel to the direction of view in FIG. 3.

With reference to FIG. 4, the port areas 18 and 19 are adapted to be machined after the work hardening step is performed. As illustrated, a port area 19 is bored, threaded and otherwise machined by suitable tools well known in the fitting industry to form an inverted flare type seat 26 internal of the body 10 and associated internal threads 27. Also machined in the body 10 is a central flow passage 28 extending from the seat 26 to a longitudinal bore 32 in which pistons or other pressure responsive means may be assembled.

The future location of the internal seat and threads 26 and 27 in the body blank 10 is indicated by phantom lines 36 in FIGS. 2 and 3. Various dots illustrated in FIGS. 1-3 indicate points at which experimental hardness measurements were made to determine the relative increase in hardness at the port areas 18 and 19 relative to the remainder of the body 10. The three digit numerals connected to the dots by arrows represent hardness readings in Rockwell B scale. The measurements were taken on surfaces exposed when a sample blank 10 was cut on planes represented by the respective FIGS. 2 and 3. The readings indicated on the lower portion of FIG. 3 namely, those ranging from 51.8 to 58.3, represent the resulting hardness of material in its extruded or drawn condition without subsequent metallurgical treatment. The various other readings at the upper portion of FIG. 3 and the readings in FIG. 2 represent relative hardness readings in the port areas resulting from local hardening. As shown, these readings range from 60.0 to 76.5. The higher readings, representing greater hardness, illustrate the effects of the local work hardening of the port areas 18 and 19 by compression and plastic deformation of material adjacent and intermediate the penetrations 21. By way of example, the sample body measured approximately 0.710 inches in thickness between the planar surfaces 12 and 13. For test purposes the port areas 18 and 19 were worked to different extents by varying the depth of the penetrations 20 and 21, with each of the penetrations 20 at the left port area 18 being approximately 0.042 inches deep and with the penetrations 21 at the right hand port area 19 each being approximately 0.027 deep. The total depth of penetration at the left port area 18 represented approximately 11% of the width of the body 10 while at the right port 19 the penetrations 21 amounted to approximately 7% of the width of the body 10.

The depressions 20 and 21 were formed by a tool face measuring approximately 5/16 inch square so that the area of each impression 20 and 21 was approximately 0.1 inch in area. It may be deduced from the hardness reading locations that the area effectively hardened was somewhat larger than the areas of the impressions 20 and 21 themselves. Thus, where the impressions 20 and 21 have dimensions approximating the dimensions of the seat 26 and threads 27, as illustrated, adequate hardening of local port areas will be insured. The total cross-sectional area of the body 10 was approximately 3.1 square inches. Accordingly, the ratio of cross-sectional body area to impression area per side for one port is approximately 31 to 1 so that the area ratio between the body cross section and impression area for 2, 3 and 4 ports is approximately 16 to 1, 10 to 1 and 8 to 1 respectively.

It may be appreciated from these ratios, that only a small portion of the fitting body need be deformed to work harden the critical port areas. This permits the use of relatively low force capacity machines or punches to form the impressions 20 and 21 and, consequently, permits such work to be done at a high production rate in an economic manner. It may also be appreciated that the work hardening of only local areas leaves noncritical areas relatively soft to facilitate other required forming or machining operations. For example, the bore 32 may be drilled at optimum speed and surface finished through the relatively soft body of the blank 10 and a lug 38 may be provided on the body 10 between the projections 11 to provide a means of attaching the body to a mounting bracket (not shown). The body may thereafter be economically and reliably fastened to an apertured mounting bracket by positioning the lug 38 through a mounting bracket (not shown) and upsetting or spinning the projecting portion of the lug in the manner of a rivet. These procedures would be impossible if the entire body including the lug 38 were work hardened in order to increase the hardness of the port areas 18 and 19. Restricting the size of the work hardened areas, additionally, avoids use of expensive closed dies for the depression forming operation which might otherwise be necessary to maintain the original blank shape.

Although a preferred embodiment of the invention is illustrated, it is to be understood that various modifications and rearrangements of parts may be resorted to without departing from the scope of the invention disclosed and claimed herein.

What is claimed is:

1. An integral body of work hardenable brass, said body having an extruded cross section including at least one port projection, an internal seat and threads in a central area of said port projection, at least one indentation on an exterior surface of said projection, said indentation resulting from plastic displacement of material at said central area whereby the material below said indentation forming said central port area and including said seat and said threads is in a locally work hardened state throughout the thickness of the body from one face to the other produced by local cold working substantially limited to the area of the one port projection whereby a major portion of the body is not hardened beyond its extruded condition.

2. An integral housing body of work hardenable brass having an irregular extruded cross section including a plurality of port projections, each of said port projections including a central area having internally machined seat and threads, external surfaces of said central areas being indented on opposite sides by plastic deformation of local material whereby the central area of said port projections including said seats and threads are in a locally work hardened state throughout the thickness of the body from one face to the other produced by local cold working substantially limited to said central areas and are relatively harder than portions of said fitting adjacent said projections, the area of said indented external surfaces being substantially less than the remaining nonindented surface areas of said body whereby a major portion of the body is not hardened beyond its extruded condition.

3. A brake warning switch housing body of brass having an irregular extruded cross section including at least a pair of port projections, the central areas of each of said port projections including an inverted flare type seat, said body including a pair of planar oppositely facing nonextruded sides, each of said planar nonextruded sides having indentations at said central areas through plastic displacement of material at said central areas whereby said central areas including said seats are in a locally work hardened state throughout the thickness of the body from one side to the other produced by local cold working substantially limited to the area of the port projections and are relatively harder than portions of said body adjacent said projections, the area of said indentations being substantially less than the total area of said extruded cross section whereby a major portion of the body is not hardened beyond its extruded condition.

4. An integral body for receiving a plurality of threaded fittings, said body being formed of brass in a work hardenable condition, said body having an irregular multisided, extruded solid cross section and a pair of parallel opposed faces transverse to the extrusion direction, the spacing of said faces defining the thickness of the body, the sides of said cross section forming a plurality of body projections, a plurality of threaded port areas in the body, the threads of said port areas extending from said sides inwardly on the body transverse to the direction of extrusion, at least one of said port areas being in a locally work hardened state throughout the thickness of the body from one face to the other produced by local cold working substantially limited to the area of the one port and produced by tool means driven into at least one of said body faces in a direction substantially parallel to the extrusion direction and limited in area to approximately that of the one body port, said one body port including threads adapted to receive a fitting to be connected to said body, said threads being formed at said one port area on said body after said one port area is locally work hardened.

5. An integral multiported body for receiving a plurality of threaded fittings, said body being formed of brass in a work hardenable condition, said body having an irregular multisided, extruded solid cross section and a pair of opposed planar parallel faces transverse to the extrusion direction, a plurality of port areas in the body, each of said port areas including internal threads and an associated internal seat, the threads of said port areas extending from said sides inwardly in the body transverse to the direction of extrusion, said port areas being locally work hardened throughout the thickness of the body from one of said faces to the other, the work hardening of said port areas resulting from local cold working of at least a portion of the port areas produced by tool means driven into each of said body faces in a direction substantially parallel to the extrusion direction and limited to zones on said faces within projections of said port areas, whereby a major portion of the body is not hardened beyond its extruded condition, the cold flow displacement of material by said tool means being limited to that producing an increase in hardness throughout the thickness of the body but not causing the body to be significantly distorted from its initial blank configuration, said threads and seat area being formed in said body after localized hardening of said port areas.

* * * * *